United States Patent
Nakamura et al.

[11] Patent Number: 6,083,315
[45] Date of Patent: *Jul. 4, 2000

[54] AGGLOMERATED PIGMENT, PROCESS FOR PRODUCING THE SAME, AQUEOUS PIGMENT DISPERSION, AND WATER-BASED INK COMPOSITION

[75] Inventors: Hiroto Nakamura; Hidehiko Komatsu; Michinari Tsukahara; Hideo Yamazaki, all of Nagano; Minoru Waki, Hyogo; Naoki Okamoto, Hyogo; Kazumi Adachi, Hyogo, all of Japan

[73] Assignees: Seiko Epson Corporation, Tokyo; Mikuni Color Ltd., Hyogo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/996,194

[22] Filed: Dec. 22, 1997

[30] Foreign Application Priority Data

Dec. 20, 1996 [JP] Japan ................................ 8-342226
Jun. 2, 1997 [JP] Japan ................................ 9-144058
Dec. 5, 1997 [JP] Japan ................................ 9-335470

[51] Int. Cl.[7] ............................................ C09B 67/50
[52] U.S. Cl. .................... 106/410; 106/31.6; 106/402; 106/411; 106/413; 106/493; 106/494; 106/495; 106/496; 106/497; 106/498
[58] Field of Search ................... 106/31.6, 410, 106/411, 413, 494, 495, 493, 496, 497, 498, 402

[56] References Cited

U.S. PATENT DOCUMENTS 2,526,345 10/1950 Giambalvo ............................ 106/411
3,582,380 6/1971 Hamilton ............................... 106/402
4,957,841 9/1990 Macholdt et al. ...................... 430/110
5,728,204 3/1998 Sattar et al. ............................. 106/411

FOREIGN PATENT DOCUMENTS

| | | |
|---|---|---|
| 0 272 649 A2 | 6/1988 | European Pat. Off. . |
| 0 359 123 A2 | 3/1990 | European Pat. Off. . |
| 08283596 | 10/1996 | European Pat. Off. . |
| 1 467 419 | 12/1968 | Germany . |
| 54-10023 | 1/1979 | Japan ............................ C09D 11/16 |
| 56-147871 | 11/1981 | Japan ............................ C09D 11/00 |
| 56-155262 | 12/1981 | Japan ............................ C09D 11/00 |
| 4-85375 | 3/1982 | Japan ............................ C09D 11/00 |
| 83-28303 | 6/1983 | Japan ............................ C09B 67/22 |
| 92-23666 | 4/1992 | Japan ............................ C09D 11/16 |
| 5-98200 | 4/1993 | Japan ............................. C09D 7/12 |
| 5-179183 | 7/1993 | Japan ............................ C09D 11/00 |
| 96-3049 | 1/1996 | Japan ............................ C09B 67/20 |
| 1121029 | 7/1968 | United Kingdom . |

*Primary Examiner*—Helene Klemanski
*Attorney, Agent, or Firm*—Sughrue, Mion, Zinn, Macpeak & Seas, PLLC

[57] ABSTRACT

An agglomerated pigment comprises (1) an organic pigment compound, (2) either a sulfonated organic pigment compound obtained by incorporating at least one sulfonic group into the organic pigment compound or a sulfonated organic pigment derivative obtained by incorporating at least one sulfonic group into a derivative of the organic pigment compound, (3) univalent inorganic counter ions bonded to sulfonic groups of component (2), and (4) bivalent or higher inorganic counter ions which are bonded to sulfonic groups of component (2) and wherein each such group has an at least univalent positive charge, the surface of the agglomerated organic pigment as a whole being positively charged. An aqueous pigment dispersion and a water-based ink composition both having excellent storage stability, an agglomerated pigment for use as a raw material for the dispersion, and a process for producing the pigment are provided.

14 Claims, 1 Drawing Sheet

6,083,315

AGGLOMERATED PIGMENT, PROCESS FOR PRODUCING THE SAME, AQUEOUS PIGMENT DISPERSION, AND WATER-BASED INK COMPOSITION

BACKGROUND OF THE INVENTION

1. Field of the Invention

The present invention relates to an agglomerated pigment, a process for producing the same, an aqueous pigment dispersion, and a water-based ink composition. Use of the novel agglomerated pigment according to the present invention readily gives an aqueous pigment dispersion in which the pigment is in a satisfactorily dispersed state and which after preparation undergoes little change in viscosity or pigment particle diameter during storage. This aqueous pigment dispersion can be advantageously used as a colorant for water-based inks such as ink-jet printer inks, writing utensil inks, etc.

2. Description of the Prior Art

Many investigations have recently been made on the utilization of pigments, in place of dyes, as a colorant for ink-jet printer inks, writing utensil inks, etc., because of the excellent fastness properties of pigments. In this application, it is important to stably disperse fine particles of a pigment into water since pigments are insoluble in water unlike dyes. A generally employed technique for improving the wettability of a pigment by water and thus preventing pigment sedimentation is to add to the pigment one or more dispersants selected from various surfactants, water-soluble resins, and the like and reduce the pigment into finer particles using a dispersing machine such as a sand grinder or a ball mill.

For example, JP-A-54-10023 (the term "JP-A" as used herein means an "unexamined published Japanese patent application") discloses a water-based ink composition for writing utensils which comprises a pigment, a dispersant, and an aqueous medium, and in which the dispersant is a polymer having a hydrophilic part and an oleophilic part and the aqueous medium is a nonvolatile hydrophilic organic solvent. In JP-A-56-147871 is described a recording liquid comprising at least a pigment, a polymeric dispersant, and an aqueous medium containing a nonionic surfactant. In JP-A-56-155262 is reported a recording liquid and the like which have been improved in stability by employing a combination of a pigment and dye of similar colors. However, these ink compositions have problems such as flocculation of dispersed fine particles and changes in properties, e.g., viscosity. The prior art ink compositions thus have insufficient stability and are unsuitable for use in the thin tubes of writing utensils or in the minute nozzles of ink-jet printer heads, in which resolution is being heightened more and more in recent years.

Many proposals have been made on techniques for eliminating the drawbacks described above which comprise improving stability by modifying the chemical properties of a dispersant or subjecting a pigment to a surface treatment or the like. For example, an ink composition for ink-jet recording which employs a polymeric dispersant is reported in JP-A-4-85375. In JP-A-5-179183 is described a water-based pigment-containing ink for ink-jet printers which contains a polymeric dispersant having a backbone made up of hydrophilic parts and hydrophobic parts arranged regularly. In JP-B-4-23666 (the term "JP-B" as used herein means an "examined Japanese patent publication") is described a water-based pigment ink for drawing and the like which employ a hydrophilized pigment obtained by treating the surface voids of a pigment with an N-alkanolamine and adsorbing a nonionic surfactant onto the treated surface. These pigment dispersions containing a dispersant which has modified chemical properties or containing a pigment which has undergone a surface treatment or the like can have far higher stability than pigment dispersions prepared without using such a technique. However, the techniques described above each was intended mainly to stabilize dispersions of carbon black, which has relatively high polarity and is porous.

On the other hand, organic pigments are less apt to strongly adsorb dispersants because the particle surfaces thereof generally have low polarity. Techniques have been proposed in which a pigment derivative synthesized beforehand by forming parts having an affinity for a dispersant or incorporating polar groups is adsorbed onto the surface of a pigment and the adsorbed pigment derivative molecules are used as adsorption sites for the dispersant. Coating compositions or printing inks which utilize such a pigment derivative are described, e.g., in JP-B-58-28303, JP-A-5-98200, and JP-B-8-3049. However, since these techniques were mainly intended to produce non-aqueous pigment dispersions, it has been difficult to apply these techniques directly to aqueous dispersions.

The present inventors made intensive studies in order to obtain an aqueous organic-pigment dispersion having satisfactory pigment dispersibility and excellent storage stability. As a result, it has been found that an aqueous organic-pigment dispersion having the desired excellent pigment dispersibility and storage stability is obtained from an agglomerated organic pigment obtained by treating the surface of sulfonated agglomerates of an organic pigment with univalent counter ions to bring the agglomerate surface into a positively charged state. The present invention has been achieved based on this finding.

SUMMARY OF THE INVENTION

Accordingly, an object of the present invention is to provide an agglomerated organic pigment for use as a raw material for an aqueous organic-pigment dispersion having excellent pigment dispersibility and storage stability, and to provide a process for producing the agglomerated pigment.

Another object of the present invention is to provide an aqueous pigment dispersion and a water-based ink composition both obtained from the agglomerated organic pigment.

The present invention relates to an agglomerated organic pigment which comprises (1) an organic pigment compound, (2) either a sulfonated organic pigment compound obtained by incorporating at least one sulfonic group into the organic pigment compound or a sulfonated organic pigment derivative obtained by incorporating at least one sulfonic group into a derivative of the organic pigment compound, (3) univalent inorganic counter ions bonded to sulfonic groups of component (2), and (4) bivalent or higher inorganic counter ions which are bonded to sulfonic groups of component (2) and each has an at least univalent positive charge, the surface of said agglomerated organic pigment as a whole being positively charged.

The present invention further relates to a process for producing the agglomerated organic pigment described above which comprises the steps of:

(1) bringing an organic pigment compound into contact with either a sulfonated organic pigment compound obtained by incorporating at least one sulfonic group into the organic pigment compound or a sulfonated organic pigment derivative obtained by incorporating at least one sulfonic group into a derivative of the organic pigment compound to thereby yield sulfonated agglomerates of the organic pigment compound;

(2) treating the sulfonated agglomerates with a compound containing a univalent inorganic ion to replace at least one of the ionic bonds of each of bivalent or higher inorganic counter ions which have been bonded to the sulfonic groups with the univalent inorganic ion to thereby convert the bivalent or higher inorganic counter ions into bivalent or higher inorganic counter ions having an at least univalent positive charge, thereby yielding counter-ion-replaced agglomerates; and (3) washing the counter-ion-replaced agglomerates to remove the inorganic ions not bonded to the sulfonic groups.

The present invention furthermore relates to an aqueous dispersion and a water-based ink composition both containing fine organic-pigment particles obtained by pulverizing the agglomerated organic pigment described above.

The term "agglomerated organic pigment" as used herein means a solid formed mainly by the agglomeration and aggregation of crystals of an organic pigment compound, and includes fine particles or powder particles having a particle diameter of about 10 nm or larger, granules having a particle diameter of about 1 mm or larger, and agglomerates having a particle diameter of about 1 cm or larger.

DESCRIPTION OF THE PREFERRED EMBODIMENTS

Figure 1:
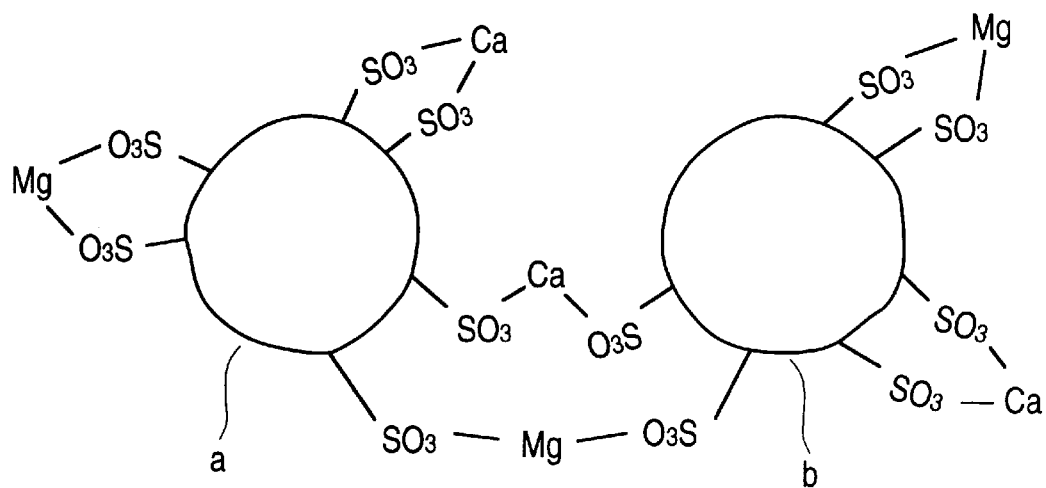
FIG. 1 is a diagrammatic view illustrating the surface state of pigment agglomerates in which sulfonic groups have been incorporated but which have not undergone a washing treatment with univalent metal ions.

The organic pigment compound contained in the agglomerated organic pigment according to the present invention is not particularly limited. For example, the organic pigment compound can be a quinacridone pigment, phthalocyanine pigment, azo pigment, quinophthalone pigment, or isoindolinone pigment. The pigment compound is not limited also in hue, and can be a magenta pigment compound, yellow pigment compound, or cyan pigment compound.

Preferred examples of the magenta pigment include quinacridone pigments such as C.I. Pigment Red 122, 202, and 209 and C.I. Pigment Violet 19. Examples thereof further include C.I. Pigment Red 1, 2, 3, 4, 5, 6, 7, 8, 9, 10, 17, 22, 23, 30, 31, 38, 88, 112, 114, 123, 146, 149, 166, 168, 170, 172, 177, 178, 179, 185, 190, 193, and 219.

Examples of the yellow pigment include C.I. Pigment Yellow 1 (Fast Yellow G), 2, 3, 5, 6, 10, 12, 13, 14, 15, 16, 17, 24, 55, 74, 81, 83 (Disazo Yellow HR), 95, 97, 98, 100, 101, 104, 108, 117, 120, 138, and 153. Examples thereof further include isoindolinone pigments such as C.I. Pigment Yellow 109 and 110.

Examples of the cyan pigment include phthalocyanine pigments such as C.I. Pigment Blue 15 (Phthalocyanine Blue R), 15:1, 15:2, 15:3 (Phthalocyanine Blue G), 15:4, 15:6 (Phthalocyanine Blue E), and 16. Examples thereof further include C.I. Pigment Blue 56 and 60, C.I. Pigment Orange 5, 13, 16, 36, 43, and 51, and C.I. Pigment Green 7, 10, and 36.

For producing the agglomerated organic pigment according to the present invention, any one of the aforementioned pigments may be used alone or a suitable combination of two or more thereof may be used.

The agglomerated organic pigment according to the present invention can be prepared, for example, by a process comprising:

(1) a step of yielding sulfonated agglomerates which comprises bringing an organic pigment compound into contact with either a sulfonated organic pigment compound obtained by incorporating at least one sulfonic group into the organic pigment compound or a sulfonated organic pigment derivative obtained by incorporating at least one sulfonic group into a derivative of the organic pigment compound to thereby yield sulfonated agglomerates of the organic pigment compound;

(2) a step of yielding counter-ion-replaced agglomerates which comprises treating the sulfonated agglomerates with a compound containing a univalent inorganic ion to replace at least one of the ionic bonds of each of bivalent or higher inorganic counter ions which have been bonded to the sulfonic groups with the univalent inorganic ion to thereby convert the bivalent or higher inorganic counter ions into bivalent or higher inorganic counter ions having an at least univalent positive charge, thereby yielding counter-ion-replaced agglomerates; and (3) a step of removing inorganic ions which comprises washing the counter-ion-replaced agglomerates to remove the inorganic ions not bonded to the sulfonic groups.

In the step of yielding sulfonated agglomerates, sulfonic groups are incorporated into an organic pigment produced generally in an agglomerated state. The incorporation of sulfonic groups can be accomplished, for example, by incorporating either a sulfonated organic pigment compound or a sulfonated organic pigment derivative into any of the aforementioned organic pigment compounds.

The sulfonated organic pigment compound can be easily prepared by treating an organic pigment compound by an ordinary sulfonation reaction (e.g., treatment with fuming sulfuric acid) to thereby incorporate sulfonic groups. The sulfonated organic pigment derivative also can be easily prepared by likewise treating an organic pigment derivative by the ordinary sulfonation reaction.

Specifically, the sulfonated agglomerates can be produced, for example, as follows. An organic pigment compound is mixed with a sulfonated organic pigment compound or sulfonated organic pigment derivative, and the mixture of the two is dissolved in an aqueous solvent having high dissolving power (e.g., sulfuric acid). An organic solvent (e.g., benzene, toluene, or hexane) is added to the resultant aqueous solution to transfer the dissolved substances from the aqueous phase to the organic phase. Subsequently, the aqueous phase is removed and the organic solvent in the residual organic phase is volatilized off, whereby the target pigment agglomerates having sulfonic groups incorporated therein can be obtained. The mixing of the organic pigment compound with the sulfonated organic pigment compound or sulfonated organic pigment derivative may be conducted either in any stage in the production of the organic pigment compound as agglomerates or after the formation of the organic pigment compound as agglomerates. Alternatively, use may be made of a method in which an aqueous solution of the sulfonated organic pigment compound or sulfonated organic pigment derivative is added to an aqueous suspension of the pigment compound to thereby deposit the sulfonated organic pigment compound or sulfonated organic pigment derivative on the surface of the pigment compound.

The organic pigment derivative is not particularly limited as long as it is a compound capable of being stably incorporated in the target organic pigment compound. It is however preferred to use, for example, a compound which is compatible with the target organic pigment compound and has the same basic framework as the target organic pigment compound. In the case where the target pigment compound is a quinacridone type organic pigment (e.g., a magenta pigment having a quinacridone framework corresponding to C.I. Pigment Red 122, 202, or 209 or C.I. Pigment Violet 19), the organic pigment derivative can, for example, be a compound represented by general formula (I):

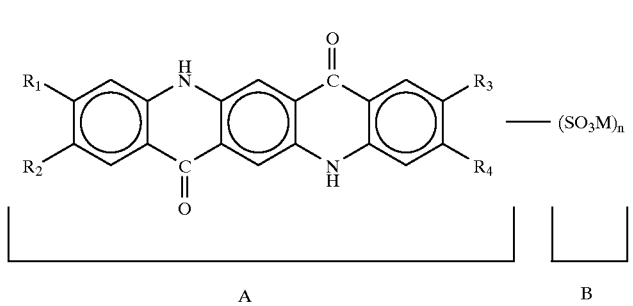

(I)

wherein $R_1$, $R_2$, $R_3$, and $R_4$ each independently represents a hydrogen atom, a halogen atom (e.g., chlorine or bromine), or a methyl group; M is a counter metal ion; and n is an integer of 1 or larger (e.g., 1 to 10). Especially preferred examples of the compound represented by general formula (I) include a compound wherein $R_1$, $R_2$, R3, and $R_4$ each is a hydrogen atom, a compound wherein $R_1$ and $R_4$ each is a hydrogen atom and $R_2$ and $R_3$ each is a methyl group, a compound wherein $R_1$ and $R_4$ each is a hydrogen atom and $R_2$ and $R_3$ each is a chlorine atom, and a compound wherein $R_1$ and $R_4$ each is a chlorine atom and $R_2$ and $R_3$ each is a hydrogen atom.

In the case where the target pigment compound is a copper phthalocyanine pigment, the organic pigment derivative can, for example, be a compound represented by general formula (II):

incorporated. It is preferred to select a compound in which block A has a chemical structure similar to that of the dispersed substance (pigment compound).

Besides being produced through the direct sulfonation of pigment agglomerates by the method described above, a sulfonated isoindolinone pigment can be produced by the condensation of 4,5,6,7-tetrachloroisoindoline with a sulfonated aromatic primary diamine because an isoindolinone pigment can be synthesized by the condensation of 4,5,6,7-tetrachloroisoindoline with an aromatic primary diamine.

As described above, the sulfonated organic pigment compound or sulfonated organic pigment derivative generally consists of a part (block A) having a chemical structure similar to that of the dispersed substance (pigment compound) and a part (block B) comprising one or more sulfonic functional groups and serving to solubilize the compound or derivative in dispersion medium (water). In the sulfonated organic pigment compound or sulfonated organic pigment derivative, block A functions to deposit on the pigment compound more tenaciously than ordinary dispersants adsorbed thereonto, while block B undergoes hydrolysis in water and thus functions to shift the surface potential of the pigment particles so that the particle surface

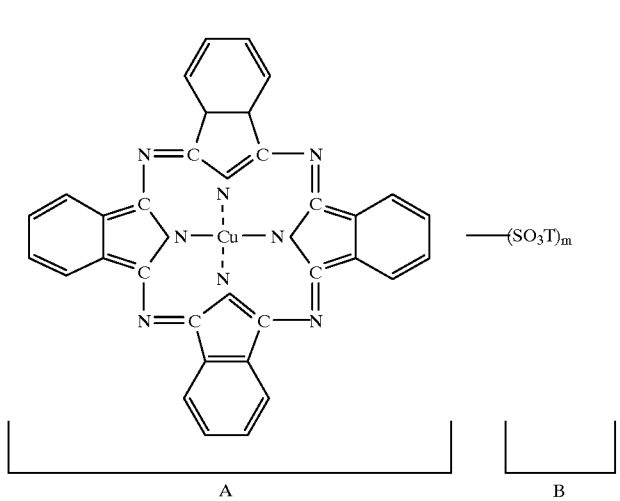

(II)

wherein T is a counter metal ion and m is an integer of 1 or larger (e.g., 1 to 10).

The compounds respectively represented by general formulae (I) and (II) each consists of block A, which comprises the basic framework characteristic of the organic pigment, and block B, which comprises one or more sulfonic groups is negatively charged and that electrical repulsion among the particles in the dispersion is enhanced. The effect of the sulfonated compound or derivative is hence higher than the dispersing/stabilizing function of ordinary dispersants. Furthermore, in the pigment dispersion of the present invention, which will be described later, the fine pigment particles can be made to have even better dispersibility and stability by using a known surfactant in combination therewith.

The incorporation amount of sulfonic groups is preferably $10 \times 10^{-6}$ equivalents or larger per g of the pigment agglomerates. If the incorporation amount of sulfonic groups is smaller than $10 \times 10^{-6}$ equivalents, the dispersion prepared from the pigment agglomerates may have insufficient storage stability to suffer sedimentation of the dispersed substance. There is no particular upper limit on the incorporation amount of sulfonic groups. However, the amount thereof is preferably not larger than $60 \times 10^{-6}$ equivalents from the standpoint of cost. This is because even when the incorporation amount of sulfonic groups is increased beyond $60 \times 10^{-6}$ equivalents, there are cases where the effect of improving storage stability is not enhanced any more.

Subsequently, the sulfonated agglomerates obtained by the above-described step of yielding sulfonated agglomerates are treated with a compound containing a univalent inorganic ion. Examples of the compound containing a univalent inorganic ion include the hydroxides of strong alkalis, e.g., alkali metals (e.g., lithium, sodium, and potassium), and ammonium hydroxide. The sulfonated agglomerates are preferably treated with an aqueous sodium hydroxide solution having a concentration of about from 0.1 to 1 N. Specifically, the sulfonated agglomerates are placed in an aqueous solution of a strong alkali and the resultant mixture is shaken with a paint shaker or the like.

Figure 2:
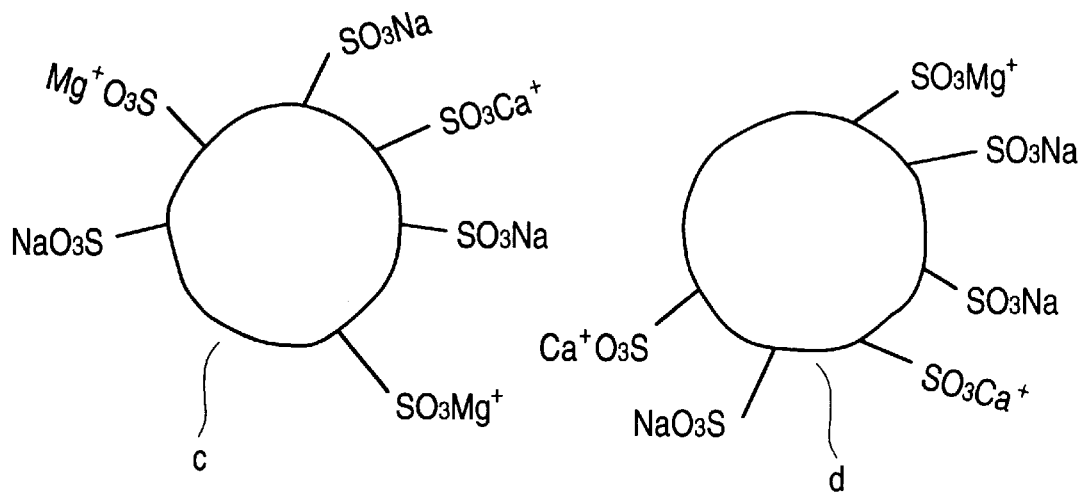
FIG. 2 is a diagrammatic view illustrating the surface state of pigment agglomerates which have undergone a surface treatment according to the process of the present invention.

The sulfonated agglomerates contain many sulfonic groups, part of which are thought to be crosslinked with bivalent or higher inorganic counter ions. For example, it is thought that as shown in FIG. 1, sulfonic groups on each agglomerate each has been crosslinked to another sulfonic group on the same agglomerate or to a sulfonic group on another agglomerate with calcium (Ca) or magnesium (Mg) as a bivalent inorganic counter ion. It is thought that when such agglomerates are treated with a compound of a univalent inorganic ion, one side of each crosslink is replaced with the univalent inorganic ion (e.g., Na) simultaneously with cleavage and the sulfonic group on the other side of the crosslink becomes, e.g., an —$SO_3Mg^+$ or —$SO_3Ca^+$ group, as shown in FIG. 2. Consequently, the surface of the counter-ion-replaced agglomerates obtained by treatment with the compound of a univalent inorganic ion is in a positively charged state.

Examples of the bivalent or higher inorganic counter ions include ions of alkaline earth metals (e.g., barium, calcium, and magnesium), copper, iron, aluminum, nickel, tin, strontium, and zinc.

The treatment with the compound of a univalent inorganic ion is preferably conducted to such a degree that the surface of the counter-ion-replaced agglomerates comes to be positively charged.

In the process of the present invention, the step of removing inorganic ions is then conducted in which the counter-ion-replaced agglomerates are washed to remove the inorganic ions not bonded to the sulfonic groups. The cleaning liquid which can be used is not limited as long as it is an aqueous liquid free from ions to such a degree as not to prevent dissolution of salts therein. It is however preferred to use ion-exchanged water or a mixture of water and ethyl ether (the mixture has the improved ability to infiltrate into agglomerates).

The aqueous dispersion according to the present invention can be prepared by evenly dispersing the agglomerated pigment described above into water. A dispersing technique which itself is conventionally known can be utilized for preparing the dispersion.

For example, an aqueous vehicle is prepared beforehand which contains a proper dispersant dissolved therein in an amount suitable for the addition amount of the surface-treated agglomerated pigment according to the present invention. To the vehicle is added the surface-treated agglomerated organic pigment. Subsequently, the agglomerated organic pigment is reduced into fine particles using a known dispersing machine (e.g., a mixing mill such as a bead mill or jet mill). If the resultant dispersion contains coarse particles, the dispersion is preferably subjected to centrifugal treatment with a centrifuge, treatment with a filter, or the like to remove the coarse particles.

The pigment dispersion preferably has a pigment content in the range of from 5 to 70 parts by weight per 100 parts by weight of the pigment dispersion. If the pigment dispersion has a pigment concentration lower than 5 parts by weight, various additive ingredients are limited in their addition amounts by solid content when the additives are added to the dispersion to prepare an ink for ink-jet recording or for writing utensils, since it is necessary to add a large amount of the pigment dispersion. In addition, the dispersing efficiency (the amount of the solid pigment which can be treated in unit time) is reduced. If the dispersion has a pigment concentration higher than 70 parts by weight, the dispersion has an increased viscosity, resulting also in a reduced dispersing efficiency.

In the dispersing step described above, inclusion of metal ions occurs. These metal ions have come from the dispersing machine or are the metal ions originally contained in the dispersant. It is therefore preferred to take account of the inclusion of metal ions in the dispersing step when pigment agglomerates are washed in the step of removing inorganic ions for preparing the agglomerated pigment.

The dispersant that can be used in the aqueous dispersion of the present invention is not limited as long as it is capable of maintaining the dispersed state of finely pulverized pigment particles and, if these particles have agglomerated into large secondary particles, it functions to reduce these large particles into primary particles or small secondary particles and to prevent the fine pigment particles from reagglomerating. Examples of dispersants having such an effect in the present invention are as follows.

In the present invention, the sulfonated organic pigment compound or sulfonated organic pigment derivative should be negatively charged through the hydrolysis of block B thereof. From this standpoint, anionic dispersants are most preferred. Also usable are nonionic dispersants which cause steric-hindrance repulsion.

Examples of the anionic dispersants include low-molecular weight dispersants such as salts of higher fatty acids, salts of higher alkyldicarboxylic acids, salts of higher alcohol/sulfuric acid esters, salts of higher alkylsulfonic acids, salts of alkylbenzenesulfonic acids, salts of alkylnaphthalenesulfonic acids, salts of naphthalenesulfonic acid/formalin polycondensates, salts of higher fatty acid/amino acid condensates, salts of dialkyl sulfosuccinates, salts of alkyl sulfosuccinates, salts of naphthenic acids, salts of (alkyl ether)carboxylic acids, acylated peptides, salts of a-olefinsulfonic acids, N-acylmethyltaurine, alkyl ether sulfates, secondary higher alcohol ethoxysulfates, salts of alkyl ether phosphates, salts of alkyl phosphates, ammonium salts of polyoxyethylene alkyl ether sulfates, sodium salts of polyoxyethylene alkyl ether sulfates, ammonium salts of polyoxyethylene alkylphenyl ether sulfates, sodium salts of polyoxyethylene alkylphenyl ether sulfates, polyoxyethylene alkyl sulfate monoethanolamines, ammonium salts of polyoxyethylene alkyl ether phosphates, potassium salts of polyoxyethylene alkyl ether phosphates, polyoxyethylene alkyl ether phosphate diethanolamines, sodium alkylnaphthalenesulfonates, and sodium lauryl sulfate. Examples thereof further include polymeric dispersants such as alkali-soluble resin dispersants, e.g., acrylic acid/styrene copolymers, acrylic ester/methacrylic acid copolymers, acrylic acid/methacrylic ester copolymers, and styrene/maleic acid copolymers. For dissolving such a polymeric dispersant in water, a neutralizing agent can be used such as ammonia or an alkanolamine (e.g., monoethanolamine, N,N-dimethylethanolamine, diethanolamine, N-butylethanolamine, or triethanolamine).

Examples of the nonionic dispersants which can be used in the present invention include fluorochemical surfactants, silicone surfactants, polyoxyethylene sorbitan monolaurate, polyoxyethylene sorbitan monostearate, polyoxyethylene alkylphenyl ethers, sorbitan monostearate, acetylene glycol, ethylene oxide adducts of acetylene glycol (acetylene glycol alcohol ethylene oxide), propylethanolamide, polyoxyethylene alkyl ethers, and polyoxyethylene alkylphenyl ethers.

The incorporation amount of the dispersant is preferably from 0.1 to 200 parts by weight per 100 parts by weight of the pigment in order to further improve the dispersibility of fine pigment particles. If the incorporation amount thereof is smaller than 0.1 part by weight, dispersion stability cannot be ensured. If the incorporation amount thereof exceeds 200 parts by weight and this dispersion is used to prepare an ink for ink-jet printers or writing utensils, the dispersant may increase the viscosity of the ink or adversely influence other properties of the ink.

Besides water serving as the main solvent, a high-boiling, lowly volatile, water-soluble organic solvent can be incorporated into the pigment dispersion of the present invention for the purpose of preventing undesirable drying or freezing. Examples of the water-soluble organic solvent include polyhydric alcohols such as ethylene glycol, diethylene glycol, propylene glycol, polyethylene glycol, glycerol, and diglycerol.

The pigment dispersion of the present invention may contain other additives according to need. Examples thereof include pH regulators, such as potassium dihydrogen phosphate and disodium hydrogen phosphate, and additives for mildew proofing, rot proofing, rust prevention, etc., such as benzoic acid, dichlorophene, hexachlorophene, sorbic acid, p-hydroxybenzoic esters, ethylenediaminetetraacetic acid salts, sodium dehydroacetate, 1,2-benzothiazolin-3-one (trade name: Proxel XLII; manufactured by ICI Ltd.), and 3,4-isothiazolin-3-one.

The ink composition according to the present invention can be prepared from the aqueous pigment dispersion by a known method.

In the above-described process for producing the agglomerated pigment and in the process for preparing the dispersion, it is possible to determine the amount of sulfonic groups incorporated, the amount of univalent metal ions incorporated, the amount of bivalent or higher metal ions incorporated, the amount of metal ions which have come into the dispersion, etc., by ashing a sample and analyzing the resultant ash with an appropriate analyzer (e.g., apparatus for elemental analysis). Based on the results of the analysis, the processes can be controlled.

The principle of the present invention will be explained next by reference to the drawings. However, the present invention should not be construed as being limited by the following explanation.

FIG. 1 is a diagrammatic view illustrating a model surface state of pigment agglomerates which, as stated hereinabove, have undergone the incorporation of sulfonic groups thereinto but have not undergone the washing treatment with univalent metal ions. In the pigment agglomerates a and b shown in FIG. 1, crosslinks have been formed by bivalent metal ions present as counter ions for the sulfonic groups.

The present inventors have found that a pigment dispersion having significantly improved storage stability is obtained when the content of counter metal ions incorporated into the sulfonic groups of an agglomerated organic pigment is regulated so that the sum of the products of the amount by equivalent of each kind of metal ions incorporated and the reciprocal of the valency of the ions is not smaller than the neutralization equivalent of the sulfonic groups. It has been found that an effective method for accomplishing the above is to treat organic agglomerates having sulfonic groups incorporated therein with an aqueous solution of the hydroxide of a univalent metal ion and wash the resultant agglomerates with ion-exchanged water before the agglomerates are dispersed into water.

FIG. 2 is a diagrammatic view illustrating a model surface state of organic agglomerates obtained, according to the process of the present invention, by treating the organic agglomerates having sulfonic groups incorporated therein with the hydroxide of a univalent metal ion and then washing the resultant agglomerates with ion-exchanged water. When the above-described sulfonated agglomerates such as those shown in FIG. 1 are treated with a compound of a univalent inorganic ion compound, each crosslink is cleaved, with one side thereof being replaced with the univalent inorganic ion, and the other side of the crosslink becomes an —$SO_3Mg^+$ or —$SO_3Ca^+$ group. As a result, the crosslinks between the pigment agglomerates c and d are eliminated or diminished. Therefore, the surface of the counter-ion-replaced agglomerates obtained through the treatment with a compound of a univalent inorganic ion comes into a positively charged state.

The relationship between the orientation of metal ions as counter ions in an agglomerated pigment and the storage stability of a pigment dispersion is discussed here based on the models shown in FIGS. 1 and 2.

It is a known fact that the storage stability of a pigment dispersion is influenced by electrical repulsion or by the force attributable to steric hindrance caused by polymer adsorption. The present invention is based on the former, i.e., electrical repulsion. Namely, the degree in which the counter metal ions bonded to sulfonic groups of an agglomerated pigment dissociate to enhance electrical repulsion was taken in account in achieving the present invention. When the agglomerated pigment is dispersed into water, the metal ions dissociate through hydrolysis. This dissociation occurs similarly in both the model of FIG. 1 and that of FIG. 2. However, in the case of the agglomerates shown in FIG. 1, in which crosslinking ionic bonds have originally been present between the pigment agglomerates, the ionic bonds between the fine pigment particles are not completely eliminated and the fine pigment particles are apt to flocculate, as long as the hydrolytic dissociation reaction of metal ions remains incomplete. On the other hand, in the case of the pigment agglomerates shown in FIG. 2, in which no crosslinking ionic bonds have originally been present therebetween, flocculation and resultant viscosity change are inhibited since the fine pigment particles are independent of one another even when the hydrolytic dissociation reaction of metal ions remains incomplete. Therefore, the pigment dispersion is thought to have improved storage stability.

The present invention will be explained below in detail by reference to Examples, but the scope of the invention should not be construed as being limited by these Examples.

EXAMPLE 1

(1) Preparation of Agglomerated Magenta Pigment

To 80 parts by weight of 5–10° C. fuming sulfuric acid (having an $SO_3$ concentration of 25%) was added, with stirring, 10 parts by weight of quinacridone over a period of 15 minutes. The mixture obtained was stirred at 15 to 20° C. for further 10 hours and then poured into 1,000 parts by weight of ice water. The resultant suspension was filtered, and the reaction product thus separated was washed and dried to obtain a sulfonated organic pigment derivative for use in the present invention. The sulfonated organic pigment derivative obtained had an average molecular weight of 480 and had one sulfonic group per quinacridone molecule.

The monosulfonated organic pigment derivative thus obtained (1.44 parts by weight) and C.I. Pigment Red 122 (200 parts by weight) were dissolved in 12 N sulfuric acid solution. Benzene was then added to the aqueous solution to transfer the magenta pigment and the monosulfonated organic pigment derivative to the oily phase. After the sulfuric acid solution was removed, the benzene was evaporated to thereby obtain sulfonated agglomerates of C.I. Pigment Red 122.

Subsequently, the sulfonated magenta pigment agglomerates obtained were washed with 1 N sodium hydroxide solution several times to remove impurities including benzene. Thereafter, the agglomerates were further washed with ion-exchanged water to obtain a surface-treated agglomerated magenta pigment according to the present invention.

(2) Determination of Metal Ions

The surface-treated agglomerated magenta pigment was placed on a platinum dish, and sulfuric acid was added thereto to carbonize and ash the pigment. The resultant ashed sample was dissolved in dilute hydrochloric acid, and the solution was subjected to elemental analysis with an ICP emission spectrophotometer (SPS-4000, manufactured by Seiko Denshi Kogyo K.K., Japan). The incorporation amount (M) of each kind of metal ions as counter ions for the sulfonic groups of the surface-treated agglomerated magenta pigment was determined using the following equation.

$$M = Ma - Mb$$

In the above equation, M is the incorporation amount of metal ions; Ma is the amount of the metal ions in the surface-treated agglomerated magenta pigment according to the present invention, which had been obtained through alkali washing and washing with ion-exchanged water from the sulfonated agglomerates obtained by incorporating the sulfonated organic pigment derivative into the organic pigment; and Mb is the amount of the metal ions in an agglomerated magenta pigment obtained from agglomerates of the organic pigment not containing the sulfonated organic pigment derivative by washing the agglomerates with an alkali and ion-exchanged water.

The incorporation amount of univalent metal ions per g of the surface-treated agglomerated magenta pigment prepared in Example 1 (1) above was $10 \times 10^{-6}$ equivalents. The incorporation amount of bivalent and higher metal ions was $15 \times 10^{-6}$ equivalents.

(3) Determination of Sulfonic Groups

A sample [the surface-treated agglomerated magenta pigment prepared in Example 1 (1) above] was treated by the oxygen flask combustion method, and the combustion gas was absorbed in 0.3% aqueous hydrogen peroxide solution. Thereafter, the solution was analyzed by ion chromatography (2000i, manufactured by Dionex Co.) to determine the amount of sulfate ions (bivalent), which was then converted to the amount of sulfonic groups (univalent). The incorporation amount of sulfonic groups per g of the surface-treated agglomerated magenta pigment prepared in Example 1 (1) above was $15 \times 10^{-6}$ equivalents.

(4) Electrification Characteristics of Agglomerate Surface

The electrification characteristics of the surface-treated agglomerated magenta pigment were determined using the following equation.

$$C = (M1 + M2/2.5) - S$$

In the above equation, C is the amount of charges per g of the surface-treated agglomerated magenta pigment; M1 is the incorporation amount by equivalent of univalent metal ions per g of the surface-treated agglomerated pigment; M2 is the incorporation amount by equivalent of bivalent and higher metal ions per g of the surface-treated agglomerated pigment; S is the incorporation amount by equivalent of sulfonic groups per g of the surface-treated agglomerated pigment; and the value of 2.5 has been calculated, in the case of Example 1, from the incorporation amount of bivalent and higher metal ions and the valencies of the metal ions.

From the incorporation amounts by equivalent of sulfonic groups and of metal ions (univalent metal ions and bivalent and higher metal ions), the amount of charges per g of the surface-treated agglomerated magenta pigment prepared in Example 1 (1) is calculated at $1 \times 10^{-6}$ equivalents. Thus, the agglomerated pigment was found to be in a positively charged state.

(5) Preparation of Magenta Pigment Dispersion

Twenty parts by weight of the surface-treated agglomerated magenta pigment obtained in Example 1 (1) above was mixed with 4 parts by weight of an alkali-neutralized styrene/acrylic resin (used as a dispersant; average molecule weight, 7,000; acid value, 200; neutralized with ammonia) and 76 parts by weight of ion-exchanged water. This mixture was treated with a sand grinder (manufactured by Inoue Seisakusho K.K., Japan) for 1 hour to disperse the pigment. The resultant dispersion was centrifuged to remove coarse particles to thereby obtain a magenta pigment dispersion according to the present invention.

(6) Metal Ion Amount and Sulfonic Group Amount in the Dispersion

The magenta pigment dispersion obtained in Example 1 (5) above was analyzed for the content of all metal ions in the same manner as in Example 1 (2) above. As a result, the total amount of univalent metal ions and bivalent and higher metal ions contained per g of the magenta pigment dispersion prepared in Example 1 (5) above was found to be $125 \times 10^{-6}$ equivalents. The total amount of all metal ions incorporated in the agglomerated pigment through the surface treatment as prepared in Example 1 (1) above was determined to be $5 \times 10^{-6}$ equivalents per g of the dispersion from Example 1 (2). Consequently, the amount of metal ions which had come into the dispersion in the dispersion preparation step in Example 1 (5) above was $120 \times 10^6$ equivalents per g of the dispersion. On the other hand, the magenta pigment dispersion prepared in Example 1 (5) above contained sulfonic groups in an amount of $3 \times 10^{-6}$ equivalents per g of the dispersion. Therefore, the total amount of all metal ions contained per g of the magenta pigment dispersion was 47.67 times the amount of the sulfonic groups incorporated in the surface-treated agglomerated magenta pigment.

EXAMPLE 2

(1) Preparation of Agglomerated Magenta Pigment

In Example 2, a surface-treated agglomerated magenta pigment was obtained in the same manner as in Example 1 (1), except that 50 parts by weight of C.I. Pigment Red 122 (hereinafter abbreviated as R-122), 5 parts by weight of C.I. Pigment Red 202 (hereinafter abbreviated as R-202), 5 parts by weight of C.I. Pigment Red 209 (hereinafter abbreviated as R-209), and 50 parts by weight of C.I. Pigment Violet 19 (hereinafter abbreviated as V-19) were used together with 0.792 part by weight of the monosulfonated organic pigment derivative produced in Example 1 (1).

In the surface-treated agglomerated magenta pigment thus obtained, the incorporation amount of univalent metal ions per g of the pigment was $10 \times 10^{-6}$ equivalents, while that of bivalent and higher metal ions was $15 \times 10^{-6}$ equivalents. The incorporation amount of sulfonic groups per g of the surface-treated agglomerated pigment was $15 \times 10^{-6}$ equivalents. Therefore, the surface-treated agglomerated pigment was in a positively charged state, with the charge amount being $7 \times 10^{-6}$ equivalents (per g).

(2) Preparation of Magenta Pigment Dispersion

Thirty parts by weight of the surface-treated agglomerated magenta pigment, 6 parts by weight of polyoxyethylene (C=4) phenyl ether, and 10 parts by weight of diethylene glycol were mixed with a solution prepared by dissolving 0.1 part by weight of dipotassium phosphate and 0.01 part by weight of 1,2-benzothiazolin-3-one (Proxel XL-2; Zeneca Co.) in 53.89 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $322 \times 10^{-6}$ equivalents. The total amount of all metal ions incorporated in the agglomerated pigment through the surface treatment as described in Example 2 (1) above was $12 \times 10^{-6}$ equivalents per g of the dispersion. Consequently, the amount of metal ions which had come into the dispersion in the dispersion preparation step was $310 \times 10^{-6}$ equivalents per g of the dispersion. On the other hand, the magenta pigment dispersion contained sulfonic groups in an amount of $4.5 \times 10^{-6}$ equivalents per g of the dispersion. Therefore, the total amount of all metal ions contained per g of the magenta pigment dispersion was 71.56 times the amount of the sulfonic groups incorporated in the surface-treated agglomerated magenta pigment.

EXAMPLE 3

(1) Preparation of Agglomerated Magenta Pigment

In Example 3, a surface-treated agglomerated magenta pigment was obtained in the same manner as in Example 1 (1), except that V-19 (200 parts by weight) and 2.88 parts by weight of the monosulfonated organic pigment derivative produced in Example 1 (1) were used.

In the surface-treated agglomerated magenta pigment thus obtained, the incorporation amount of univalent metal ions per g of the pigment was $15 \times 10^{-6}$ equivalents, while that of bivalent and higher metal ions was $40 \times 10^{-6}$ equivalents. The incorporation amount of sulfonic groups per g of the surface-treated agglomerated pigment was $30 \times 10^{-6}$ equivalents. Therefore, the surface-treated agglomerated pigment was in a positively charged state, with the charge amount being $1 \times 10^{-6}$ equivalents (per g).

(2) Preparation of Magenta Pigment Dispersion

Forty parts by weight of the surface-treated agglomerated magenta pigment obtained in Example 3 (1) above, 6 parts by weight of an alkali-neutralized styrene/acrylic resin (used as a dispersant; average molecular weight, 7,000; acid value, 200; neutralized with ammonia), 2 parts by weight of sodium propyl sulfosuccinate, and 8 parts by weight of diethylene glycol were mixed with a solution prepared by dissolving 0.01 part by weight of 1,2-benzothiazolin-3-one (Proxel XL-2; Zeneca Co.) in 43.99 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $92 \times 10^{-6}$ equivalents. The total amount of all metal ions incorporated in the agglomerated pigment through the surface treatment as described in Example 3 (1) above was $22 \times 10^{-6}$ equivalents per g of the dispersion. Consequently, the amount of metal ions which had come into the dispersion in the dispersion preparation step was $70 \times 10^{-6}$ equivalents per g of the dispersion. On the other hand, the magenta pigment dispersion contained sulfonic groups in an amount of $8 \times 10^{-6}$ equivalents per g of the dispersion. Therefore, the total amount of all metal ions contained per g of the magenta pigment dispersion was 11.5 times the amount of the sulfonic groups incorporated in the surface-treated agglomerated magenta pigment.

EXAMPLE 4

(1) Preparation of Agglomerated Magenta Pigment

In Example 4, a surface-treated agglomerated magenta pigment was obtained in the same manner as in Example 1 (1), except that R-122 (300 parts by weight) and 2.88 parts by weight of the monosulfonated organic pigment derivative produced in Example 1 (1) were used.

In the surface-treated agglomerated magenta pigment thus obtained, the incorporation amount of univalent metal ions per g of the pigment was $15 \times 10^{-6}$ equivalents, while that of bivalent and higher metal ions was $30 \times 10^{-6}$ equivalents. The incorporation amount of sulfonic groups per g of the surface-treated agglomerated pigment was $20 \times 10^{-6}$ equivalents. Therefore, the surface-treated agglomerated pigment was in a positively charged state, with the charge amount being $12 \times 10^{-6}$ equivalents (per g).

(2) Preparation of Magenta Pigment Dispersion

Forty parts by weight of the surface-treated agglomerated magenta pigment obtained in Example 4 (1) above and 8 parts by weight of sodium propyl sulfosuccinate were mixed with 52 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $258 \times 10^{-6}$ equivalents. The total amount of all metal ions incorporated in the agglomerated pigment through the surface treatment as described in Example 4 (1) above was $18 \times 10^{-6}$ equivalents per g of the dispersion. Consequently, the amount of metal ions which had come into the dispersion in the dispersion preparation step was $240 \times 10^{-6}$ equivalents per g of the dispersion. On the other hand, the magenta pigment dispersion contained sulfonic groups in an amount of $8 \times 10^{-6}$ equivalents per g of the dispersion. Therefore, the total amount of all metal ions contained per g of the magenta pigment dispersion was 32.25 times the amount of the sulfonic groups incorporated in the surface-treated agglomerated magenta pigment.

EXAMPLE 5

(1) Preparation of Agglomerated Magenta Pigment

In Example 5, a surface-treated agglomerated magenta pigment was obtained in the same manner as in Example 1

(1), except that R-122 (400 parts by weight) and 9.6 parts by weight of the monosulfonated organic pigment derivative produced in Example 1 (1) were used.

In the surface-treated agglomerated magenta pigment thus obtained, the incorporation amount of univalent metal ions per g of the pigment was $10 \times 10^{-6}$ equivalents, while that of bivalent and higher metal ions was $120 \times 10^{-6}$ equivalents. The incorporation amount of sulfonic groups per g of the surface-treated agglomerated pigment was $50 \times 10^{-6}$ equivalents. Therefore, the surface-treated agglomerated pigment was in a positively charged state, with the charge amount being $8 \times 10^{-6}$ equivalents (per g).

(2) Preparation of Magenta Pigment Dispersion

Five parts by weight of the surface-treated agglomerated magenta pigment obtained in Example 5 (1) above was mixed with 1 part by weight of an alkali-neutralized styrene/acrylic resin (used as a dispersant; average molecular weight, 7,000; acid value, 200; neutralized with ammonia) and 94 parts by weight ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $91.5 \times 10^{-6}$ equivalents. The total amount of all metal ions incorporated in the agglomerated pigment through the surface treatment as described in Example 5 (1) above was $6.5 \times 10^{-6}$ equivalents per g of the dispersion. Consequently, the amount of metal ions which had come into the dispersion in the dispersion preparation step was $85 \times 10^{-6}$ equivalents per g of the dispersion. On the other hand, the magenta pigment dispersion contained sulfonic groups in an amount of $2.5 \times 10^{-6}$ equivalents per g of the dispersion. Therefore, the total amount of all metal ions contained per g of the magenta pigment dispersion was 36.6 times the amount of the sulfonic groups incorporated in the surface-treated agglomerated magenta pigment.

EXAMPLE 6

(1) Preparation of Agglomerated Magenta Pigment

In Example 6, a surface-treated agglomerated magenta pigment was obtained in the same manner as in Example 1 (1), except that R-122 (400 parts by weight) and 9.6 parts by weight of the monosulfonated organic pigment derivative produced in Example 1 (1) were used.

In the surface-treated agglomerated magenta pigment thus obtained, the incorporation amount of univalent metal ions per g of the pigment was $40 \times 10^{-6}$ equivalents, while that of bivalent and higher metal ions was $70 \times 10^{-6}$ equivalents. The incorporation amount of sulfonic groups per g of the surface-treated agglomerated pigment was $50 \times 10^{-6}$ equivalents. Therefore, the surface-treated agglomerated pigment was in a positively charged state, with the charge amount being $28 \times 10^{-6}$ equivalents (per g).

(2) Preparation of Magenta Pigment Dispersion

Ten parts by weight of the surface-treated agglomerated magenta pigment obtained in Example 6 (1) above and 2 parts by weight of an alkali-neutralized styrene/acrylic resin (used as a dispersant; average molecular weight, 7,000; acid value, 200; neutralized with ammonia) were mixed with a solution prepared by dissolving 0.01 part by weight of 1,2-benzothiazolin-3-one (Proxel XL-2; Zeneca Co.) in 87.99 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $36 \times 10^{-6}$ equivalents. The total amount of all metal ions incorporated in the agglomerated pigment through the surface treatment as described in Example 6 (1) above was $11 \times 10^{-6}$ equivalents per g of the dispersion. Consequently, the amount of metal ions which had come into the dispersion in the dispersion preparation step was $25 \times 10^{-6}$ equivalents per g of the dispersion. On the other hand, the magenta pigment dispersion contained sulfonic groups in an amount of $5 \times 10^{-6}$ equivalents per g of the dispersion. Therefore, the total amount of all metal ions contained per g of the magenta pigment dispersion was 7.2 times the amount of the sulfonic groups incorporated in the surface-treated agglomerated magenta pigment.

EXAMPLE 7

(1) Preparation of Agglomerated Magenta Pigment

In Example 7, a surface-treated agglomerated magenta pigment was obtained in the same manner as in Example 1 (1), except that V-19 (300 parts by weight) and 5.76 parts by weight of the monosulfonated organic pigment derivative produced in Example 1 (1) were used.

In the surface-treated agglomerated magenta pigment thus obtained, the incorporation amount of univalent metal ions per g of the pigment was $30 \times 10^{-6}$ equivalents, while that of bivalent and higher metal ions was $30 \times 10^{-6}$ equivalents. The incorporation amount of sulfonic groups per g of the surface-treated agglomerated pigment was $40 \times 10^{-6}$ equivalents. Therefore, the surface-treated agglomerated pigment was in a positively charged state, with the charge amount being $12 \times 10^{-6}$ equivalents (per g).

(2) Preparation of Magenta Pigment Dispersion

Sixty parts by weight of the surface-treated agglomerated magenta pigment obtained in Example 7 (1) above, 10 parts by weight of an alkali-neutralized styrene/acrylic resin (used as a dispersant; average molecular weight, 7,000; acid value, 200; neutralized with ammonia), and 2 parts by weight of sodium propyl sulfosuccinate were mixed with a solution prepared by dissolving 0.1 part by weight of dipotassium phosphate in 27.9 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $83 \times 10^{-6}$ equivalents. The total amount of all metal ions incorporated in the agglomerated pigment through the surface treatment as described in Example 7 (1) above was $36 \times 10^{-6}$ equivalents per g of the dispersion. Consequently, the amount of metal ions which had come into the dispersion in the dispersion preparation step was $47 \times 10^{-6}$ equivalents per g of the dispersion. On the other hand, the magenta pigment dispersion contained sulfonic groups in an amount of $24 \times 10^{-6}$ equivalents per g of the dispersion. Therefore, the total amount of all metal ions contained per g of the magenta pigment dispersion was 3.458 times the amount of the sulfonic groups incorporated in the surface-treated agglomerated magenta pigment.

EXAMPLE 8

(1) Preparation of Agglomerated Magenta Pigment

In Example 8, a surface-treated agglomerated magenta pigment was obtained in the same manner as in Example 1 (1), except that R-122 (50 parts by weight), V-19 (50 parts by weight), and 2.16 parts by weight of the monosulfonated organic pigment derivative produced in Example 1 (1) were used.

In the surface-treated agglomerated magenta pigment thus obtained, the incorporation amount of univalent metal ions per g of the pigment was $15\times10^{-6}$ equivalents, while that of bivalent and higher metal ions was $80\times10^{-6}$ equivalents. The incorporation amount of sulfonic groups per g of the surface-treated agglomerated pigment was $45\times10^{-6}$ equivalents. Therefore, the surface-treated agglomerated pigment was in a positively charged state, with the charge amount being $2\times10^{-6}$ equivalents (per g).

(2) Preparation of Magenta Pigment Dispersion

Fifty parts by weight of the surface-treated agglomerated magenta pigment obtained in Example 8 (1) above, 5 parts by weight of sodium propyl sulfosuccinate, 5 parts by weight of polyoxyethylene (C=4) phenyl ether, and 8 parts by weight of diethylene glycol were mixed with 43.99 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $157.5\times10^{-6}$ equivalents. The total amount of all metal ions incorporated in the agglomerated pigment through the surface treatment as described in Example 8 (1) above was $47.5\times10^{-6}$ equivalents per g of the dispersion. Consequently, the amount of metal ions which had come into the dispersion in the dispersion preparation step was $110\times10^{-6}$ equivalents per g of the dispersion. On the other hand, the magenta pigment dispersion contained sulfonic groups in an amount of $22.5\times10^{-6}$ equivalents per g of the dispersion. Therefore, the total amount of all metal ions contained per g of the magenta pigment dispersion was 7 times the amount of the sulfonic groups incorporated in the surface-treated agglomerated magenta pigment.

EXAMPLE 9

(1) Preparation of Agglomerated Magenta Pigment

In Example 9, a surface-treated agglomerated magenta pigment was obtained in the same manner as in Example 1 (1), except that V-19 (200 parts by weight) and 1.44 parts by weight of the monosulfonated organic pigment derivative produced in Example 1 (1) were used.

In the surface-treated agglomerated magenta pigment thus obtained, the incorporation amount of univalent metal ions per g of the pigment was $10\times10^{-6}$ equivalents, while that of bivalent and higher metal ions was $20\times10^{-6}$ equivalents. The incorporation amount of sulfonic groups per g of the surface-treated agglomerated pigment was $15\times10^{-6}$ equivalents. Therefore, the surface-treated agglomerated pigment was in a positively charged state, with the charge amount being $3\times10^{-6}$ equivalents (per g).

(2) Preparation of Magenta Pigment Dispersion

Twenty parts by weight of the surface-treated agglomerated magenta pigment obtained in Example 9 (1) above, 4 parts by weight of an alkali-neutralized styrene/acrylic resin (used as a dispersant; average molecular weight, 7,000; acid value, 200; neutralized with ammonia), and 5 parts by weight of diethylene glycol were mixed with 71 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $51\times10^{-6}$ equivalents. The total amount of all metal ions incorporated in the agglomerated pigment through the surface treatment as described in Example 9 (1) above was $6\times10^{-6}$ equivalents per g of the dispersion. Consequently, the amount of metal ions which had come into the dispersion in the dispersion preparation step was $45\times10^{-6}$ equivalents per g of the dispersion. On the other hand, the magenta pigment dispersion contained sulfonic groups in an amount of $3\times10^{-6}$ equivalents per g of the dispersion. Therefore, the total amount of all metal ions contained per g of the magenta pigment dispersion was 17 times the amount of the sulfonic groups incorporated in the surface-treated agglomerated magenta pigment.

EXAMPLE 10

(1) Preparation of Agglomerated Phthalocyanine Pigment

To 100 parts by weight of 5–10° C. fuming sulfuric acid (having an $SO_3$ concentration of 25%) was added, with stirring, 10 parts by weight of a copper phthalocyanine pigment (C.I. Pigment Blue 15:3) over a period of 15 minutes. The mixture obtained was stirred at 70 to 90° C. for further several hours and then poured into ice water. The resultant suspension was filtered, and the reaction product thus separated was washed and dried to obtain a monosulfonated organic pigment.

The monosulfonated organic pigment thus obtained (4 parts by weight) and C.I. Pigment Blue 15:3 (200 parts by weight) were dissolved in 12 N sulfuric acid solution. Benzene was then added to the aqueous solution to transfer the phthalocyanine pigment and the monosulfonated phthalocyanine pigment to the oily phase. After the sulfuric acid solution was removed, the benzene was evaporated to thereby obtain sulfonated agglomerates of C.I. Pigment Blue 15:3.

Subsequently, the sulfonated phthalocyanine pigment agglomerates obtained were washed with 1 N sodium hydroxide solution several times to remove impurities including benzene. Thereafter, the agglomerates were further washed with ion-exchanged water to obtain a surface-treated agglomerated phthalocyanine pigment according to the present invention.

In the surface-treated agglomerated phthalocyanine pigment thus obtained, the incorporation amount of univalent metal ions per g of the pigment was $15\times10^{-6}$ equivalents, while that of bivalent and higher metal ions was $30\times10^{-6}$ equivalents. The incorporation amount of sulfonic groups per g of the surface-treated agglomerated pigment was $25\times10^{-6}$ equivalents. Therefore, the surface-treated agglomerated pigment was in a positively charged state, with the charge amount being $2\times10^{-6}$ equivalents (per g).

(2) Preparation of Phthalocyanine Pigment Dispersion

Twenty parts by weight of the surface-treated agglomerated phthalocyanine pigment prepared in Example 10 (1) above was mixed with 4 parts by weight of an alkali-neutralized styrene/acrylic resin (used as a dispersant; average molecular weight, 7,000; acid value, 200; neutralized with ammonia) and 110 parts by weight of ion-exchanged water. This mixture was subjected to a dispersing step in the same manner as in Example 1 (5) above to prepare a phthalocyanine pigment dispersion.

EXAMPLE 11

(1) Preparation of Agglomerated Phthalocyanine Pigment

A surface-treated agglomerated phthalocyanine pigment was obtained in the same manner as in Example 10 (1), except that 80 parts by weight of a phthalocyanine pigment (C.I. Pigment Green 7) and 1 part by weight of a monosulfonated phthalocyanine pigment obtained therefrom [in the same manner as in Example 10 (1) above] were used.

In the surface-treated agglomerated phthalocyanine pigment thus obtained, the incorporation amount of univalent metal ions per g of the pigment was $9\times10^{-6}$ equivalents, while that of bivalent and higher metal ions was $18\times10^{-6}$ equivalents. The incorporation amount of sulfonic groups per g of the surface-treated agglomerated pigment was $15\times10^{-6}$ equivalents. Therefore, the surface-treated agglomerated pigment was in a positively charged state, with the charge amount being $1\times10^{-6}$ equivalents (per g).

(2) Preparation of Phthalocyanine Pigment Dispersion

The surface-treated agglomerated phthalocyanine pigment was subjected to a dispersing step in the same manner as in Example 10 (1) above to prepare a phthalocyanine pigment dispersion.

EXAMPLE 12

(1) Preparation of Agglomerated Isoindolinone Pigment

To 80 parts by weight of 5–10° C. fuming sulfuric acid (having an $SO_3$ concentration of 25%) was added, with stirring, 10 parts by weight of an isoindolinone pigment (C.I. Pigment Yellow 109) over a period of 15 minutes. The mixture obtained was stirred at 20 to 30° C. for further 10 hours and then poured into ice water. The resultant suspension was filtered, and the reaction product thus separated was washed and dried to obtain a monosulfonated organic pigment.

The monosulfonated organic pigment thus obtained (3 parts by weight) and 140 parts by weight of the isoindolinone pigment (C.I. Pigment Yellow 109) were dissolved in 12 N sulfuric acid solution. Benzene was then added to the aqueous solution to transfer the isoindolinone pigment and the monosulfonated isoindolinone pigment to the oily phase. After the sulfuric acid solution was removed, the benzene was evaporated to thereby obtain sulfonated pigment agglomerates.

Subsequently, the sulfonated isoindolinone pigment agglomerates obtained were washed with 1 N sodium hydroxide solution several times to remove impurities including benzene. Thereafter, the agglomerates were further washed with ion-exchanged water to obtain a surface-treated agglomerated isoindolinone pigment according to the present invention.

In the surface-treated agglomerated isoindolinone pigment thus obtained, the incorporation amount of univalent metal ions per g of the pigment was $17\times10^{-6}$ equivalents, while that of bivalent and higher metal ions was $28\times10^{-6}$ equivalents. The incorporation amount of sulfonic groups per g of the surface-treated agglomerated pigment was $25\times10^{-6}$ equivalents. Therefore, the surface-treated agglomerated pigment was in a positively charged state, with the charge amount being $3\times10^{-6}$ equivalents (per g).

(2) Preparation of Isoindolinone Pigment Dispersion

Thirty parts by weight of the surface-treated agglomerated isoindolinone pigment prepared in Example 12 (1) above, 5 parts by weight of an alkali-neutralized styrene/acrylic resin (used as a dispersant; average molecular weight, 7,000; acid value, 200; neutralized with ammonia), 1 part by weight of sodium propyl sulfosuccinate, and 8 parts by weight of diethylene glycol were mixed with 156 parts by weight of ion-exchanged water containing 0.01 part by weight of 1,2-benzothiazolin-3-one (Proxel XL-2; Zeneca Co.) dissolved therein. This mixture was subjected to a dispersing step in the same manner as in Example 1 (5) above to prepare an isoindolinone pigment dispersion.

EXAMPLE 13

(1) Preparation of Agglomerated Isoindolinone Pigment

A surface-treated agglomerated isoindolinone pigment was obtained in the same manner as in Example 12 (1), except that 300 parts by weight of an isoindolinone pigment (C.I. Pigment Yellow 110) and 8 parts by weight of the monosulfonated organic pigment obtained in Example 12 (1) above were used.

In the surface-treated agglomerated isoindolinone pigment thus obtained, the incorporation amount of univalent metal ions per g of the pigment was $20\times10^{-6}$ equivalents, while that of bivalent and higher metal ions was $38\times10^{-6}$ equivalents. The incorporation amount of sulfonic groups per g of the surface-treated agglomerated pigment was $30\times10^{-6}$ equivalents. Therefore, the surface-treated agglomerated pigment was in a positively charged state, with the charge amount being $5\times10^{-6}$ equivalents (per g).

(2) Preparation of Isoindolinone Pigment Dispersion

The surface-treated agglomerated isoindolinone pigment prepared in Example 13 (1) above was subjected to a dispersing step in the same manner as in Example 12 (2) above to prepare an isoindolinone pigment dispersion.

EXAMPLE 14

(1) Preparation of Agglomerated Isoindolinone Pigment

A surface-treated agglomerated isoindolinone pigment was obtained in the same manner as in Example 12 (1), except that 55 parts by weight of an isoindolinone pigment (C.I. Pigment Yellow 109), 55 parts by weight of another isoindolinone pigment (C.I. Pigment Yellow 110), and 2 parts by weight of the monosulfonated organic pigment obtained in Example 12 (1) above were used.

In the surface-treated agglomerated isoindolinone pigment thus obtained, the incorporation amount of univalent metal ions per g of the pigment was $13\times10^{-6}$ equivalents, while that of bivalent and higher metal ions was $25\times10^{-6}$ equivalents. The incorporation amount of sulfonic groups per g of the surface-treated agglomerated pigment was $21\times10^{-6}$ equivalents. Therefore, the surface-treated agglomerated pigment was in a positively charged state, with the charge amount being $2\times10^{-6}$ equivalents (per g).

(2) Preparation of Isoindolinone Pigment Dispersion

Twenty parts by weight of the surface-treated agglomerated isoindolinone pigment prepared in Example 14 (1) above was mixed with 4 parts by weight of an alkali-neutralized styrene/acrylic resin (used as a dispersant; average molecular weight, 7,000; acid value, 200; neutralized with ammonia), 4 parts by weight of diethylene glycol, and 106 parts by weight of ion-exchanged water. This mixture was subjected to a dispersing step in the same manner as in Example 1 (5) above to prepare an isoindolinone pigment dispersion.

EXAMPLE 15

(1) Preparation of Agglomerated Anthraquinone Pigment

An anthraquinone pigment (C.I. Pigment Red 168) was sulfonated in the same manner as in Example 10 (1) above to prepare a monosulfonated anthraquinone pigment.

A surface-treated agglomerated anthraquinone pigment was obtained in the same manner as in Example 10 (1), except that 160 parts by weight of the anthraquinone pigment (C.I. Pigment Red 168) and 3 parts by weight of the monosulfonated anthraquinone pigment were used.

In the surface-treated agglomerated anthraquinone pigment thus obtained, the incorporation amount of univalent metal ions per g of the pigment was $16\times10^{-6}$ equivalents, while that of bivalent and higher metal ions was $35\times10^{-6}$ equivalents. The incorporation amount of sulfonic groups per g of the surface-treated agglomerated pigment was $28\times10^{-6}$ equivalents. Therefore, the surface-treated agglomerated pigment was in a positively charged state, with the charge amount being $2\times10^{-6}$ equivalents (per g).

(2) Preparation of Anthraquinone Pigment Dispersion

Thirty parts by weight of the surface-treated agglomerated anthraquinone pigment prepared in Example 15 (1) above, 6 parts by weight of polyoxyethylene (C=4) phenyl ether, and 10 parts by weight of diethylene glycol were mixed with 154 parts by weight of ion-exchanged water containing 0.1 part by weight of dipotassium phosphate and 0.01 part by weight of 1,2-benzothiazolin-3-one (Proxel XL-2; Zeneca Co.) dissolved therein. This mixture was subjected to a dispersing step in the same manner as in Example 1 (5) above to prepare an anthraquinone pigment dispersion.

EXAMPLE 16

(1) Preparation of Agglomerated Perinone Pigment

A perinone pigment (C.I. Pigment Orange 43) was sulfonated in the same manner as in Example 10 (1) above to prepare a monosulfonated perinone pigment.

A surface-treated agglomerated perinone pigment was obtained in the same manner as in Example 10 (1), except that 230 parts by weight of the perinone pigment (C.I. Pigment Orange 43) and 5 parts by weight of the monosulfonated perinone pigment were used.

In the surface-treated agglomerated perinone pigment thus obtained, the incorporation amount of univalent metal ions per g of the pigment was $23\times10^{-6}$ equivalents, while that of bivalent and higher metal ions was $45\times10^{-6}$ equivalents. The incorporation amount of sulfonic groups per g of the surface-treated agglomerated pigment was $35\times10^{-6}$ equivalents. Therefore, the surface-treated agglomerated pigment was in a positively charged state, with the charge amount being $6\times10^{-6}$ equivalents (per g).

(2) Preparation of Perinone Pigment Dispersion

The surface-treated agglomerated perinone pigment prepared in Example 16 (1) above was subjected to a dispersing step in the same manner as in Example 10 (1) above to prepare a perinone pigment dispersion.

COMPARATIVE EXAMPLE 1

Comparative Example 1 relates to a dispersion prepared from a non-sulfonated agglomerated pigment consisting of magenta pigment agglomerates not containing a sulfonated pigment derivative. This dispersion was prepared by the following method.

R-122 (20 parts by weight), 4 parts by weight of an alkali-neutralized styrene/acrylic resin (used as a dispersant; average molecular weight, 7,000; acid value, 200; neutralized with ammonia), and 5 parts by weight of diethylene glycol were mixed with a solution prepared by dissolving 0.1 part by weight of dipotassium phosphate and 0.01 part by weight of 1,2-benzothiazolin-3-one (Proxel XL-2; Zeneca Co.) in 70.89 parts by weight of ion-exchanged water. This mixture was subjected to a dispersing step in the same manner as in Example 1 (5) above to prepare a dispersion of the non-sulfonated magenta pigment. The amount of metal ions contained in the dispersion thus obtained was $70\times10^{-6}$ equivalents per g of the dispersion.

COMPARATIVE EXAMPLE 2

Comparative Example 2 relates to a dispersion of a surface-treated agglomerated magenta pigment in which dispersion the amount by equivalent of metal ions contained per g of the dispersion exceeds 80 times the amount by equivalent of sulfonic groups incorporated in the surface-treated agglomerated magenta pigment contained per g of the dispersion.

(1) Preparation of Agglomerated Magenta Pigment

A surface-treated agglomerated magenta pigment was obtained in the same manner as in Example 1 (1), except that R-122 (200 parts by weight) and 1.44 parts by weight of the monosulfonated organic pigment derivative produced in Example 1 (1) were used.

In the surface-treated agglomerated magenta pigment thus obtained, the incorporation amount of univalent metal ions per g of the pigment was $10\times10^{-6}$ equivalents, while that of bivalent and higher metal ions was $15\times10^{-6}$ equivalents. The incorporation amount of sulfonic groups per g of the surface-treated agglomerated pigment was $15\times10^{-6}$ equivalents. Therefore, the surface-treated agglomerated pigment was in a positively charged state, with the charge amount being $1\times10^{-6}$ equivalents (per g).

(2) Preparation of Magenta Pigment Dispersion

Twenty parts by weight of the surface-treated agglomerated magenta pigment prepared in Comparative Example 2 (1) above and 4 parts by weight of an alkali-neutralized styrene/acrylic resin (used as a dispersant; average molecular weight, 7,000; acid value, 200; neutralized with ammonia) were mixed with a solution prepared by dissolving 0.1 part by weight of dipotassium phosphate and 0.01 part by weight of 1,2-benzothiazolin-3-one (Proxel XL-2; Zeneca Co.) in 75.89 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $255\times10^{-6}$ equivalents. The total amount of all metal ions incorporated in the agglomerated pigment through the surface treatment as described in Comparative Example 2 (1) above was $5\times10^{-6}$ equivalents per g of the dispersion. Consequently, the amount of metal ions which had come into the dispersion in the dispersion preparation step was $250\times10^{-6}$ equivalents per g of the dispersion. On the other hand, the magenta pigment dispersion contained sulfonic groups in an amount of $3\times10^{-6}$ equivalents per g of the dispersion. Therefore, the total amount of all metal ions contained per g of the magenta pigment dispersion was 85 times the amount of the sulfonic groups incorporated in the surface-treated agglomerated magenta pigment.

COMPARATIVE EXAMPLE 3

Comparative Example 3 also relates to a dispersion of a surface-treated agglomerated magenta pigment in which dispersion the amount by equivalent of metal ions contained per g of the dispersion exceeds 80 times the amount by equivalent of sulfonic groups incorporated in the surface-treated agglomerated magenta pigment contained per g of the dispersion.

(1) Preparation of Agglomerated Magenta Pigment

A surface-treated agglomerated magenta pigment was obtained in the same manner as in Example 1 (1), except that R-122 (200 parts by weight) and 2.88 parts by weight of the monosulfonated organic pigment derivative produced in Example 1 (1) were used.

In the surface-treated agglomerated magenta pigment thus obtained, the incorporation amount of univalent metal ions per g of the pigment was $15\times10^{-6}$ equivalents, while that of bivalent and higher metal ions was $40\times10^{-6}$ equivalents. The incorporation amount of sulfonic groups per g of the surface-treated agglomerated pigment was $30\times10^{-6}$ equivalents. Therefore, the surface-treated agglomerated pigment was in a positively charged state, with the charge amount being $1\times10^{-6}$ equivalents (per g).

(2) Preparation of Magenta Pigment Dispersion

Twenty parts by weight of the surface-treated agglomerated magenta pigment prepared in Comparative Example 3 (1) above, 4 parts by weight of an alkali-neutralized styrene/acrylic resin (used as a dispersant; average molecular weight, 7,000; acid value, 200; neutralized with ammonia), and 5 parts by weight of diethylene glycol were mixed with 71 parts by weight of ion-exchanged water. This mixture was subjected to a dispersing step in the same manner as in Example 1 (5) above to prepare a magenta pigment dispersion.

The total amount of univalent metal ions and bivalent and higher metal ions contained per g of the magenta pigment dispersion thus obtained was $501 \times 10^{-6}$ equivalents. The total amount of all metal ions incorporated in the agglomerated pigment through the surface treatment as described in Comparative Example 3 (1) above was $11 \times 10^{-6}$ equivalents per g of the dispersion. Consequently, the amount of metal ions which had come into the dispersion in the dispersion preparation step was $490 \times 10^{-6}$ equivalents per g of the dispersion. On the other hand, the magenta pigment dispersion contained sulfonic groups in an amount of $6 \times 10^{-6}$ equivalents per g of the dispersion. Therefore, the total amount of all metal ions contained per g of the magenta pigment dispersion was 83.5 times the amount of the sulfonic groups incorporated in the surface-treated agglomerated magenta pigment.

COMPARATIVE EXAMPLE 4

In Comparative Example 4, sulfonated agglomerates of a phthalocyanine pigment (C.I. Pigment Blue 15:3) were obtained in the same manner as in Example 10 (1) above. Thereafter, the sulfonated agglomerates, without being subjected to washing with 1 N sodium hydroxide solution and with ion-exchanged water, were used to prepare a phthalocyanine pigment dispersion in the same manner as in Example 10 (2) above.

COMPARATIVE EXAMPLE 5

In Comparative Example 5, sulfonated agglomerates of a phthalocyanine pigment (C.I. Pigment Yellow 110) were obtained in the same manner as in Example 12 (1) above. Thereafter, the sulfonated agglomerates, without being subjected to washing with 1 N sodium hydroxide solution and with ion-exchanged water, were used to prepare a phthalocyanine pigment dispersion in the same manner as in Example 12 (2) above.

[PROPERTY EVALUATION]

The dispersions according to the present invention prepared in Examples 1 to 16 and the comparative dispersions prepared in Comparative Examples 1 to 5 were examined for viscosity change and particle diameter change for the purpose of evaluating storage stability.

(1) Method for Evaluating Viscosity Change

Each dispersion was allowed to stand for 10 days in a 70° C. thermostatic chamber kept in a completely sealed state so as to prevent evaporation. The dispersions were examined for viscosity change using a rotary viscoelastometer (RFSII, manufactured by Rheometrics Inc.). The value of [viscosity after the standing]/[initial viscosity] was calculated from found viscosity values, and evaluated in the following two ratings. The results obtained are shown in Table 1, wherein A and B have the following meanings.

A (suitable for practical use):
0.9–0.95 (excluding 0.95) or 1.05–1.1 (excluding 1.05)
B (unsuitable for practical use):
below 0.9 or above 1.1

(2) Method for Evaluating Change in Average Particle Diameter

Each dispersion was allowed to stand under the same conditions as in the viscosity change measurement to examine a change in average particle diameter using a particle size analyzer of the light scattering zeta potential type (ELS-800, manufactured by Otsuka Denshi Co., Ltd., Japan). The samples were analyzed after being diluted about from 10,000 to 1,000 times so as to result in an absorbance of about from 0.1 to 0.2. The value of [average particle diameter after the standing]/[initial particle diameter] was calculated from found diameter values, and evaluated based on the same criteria as the above. The results obtained are shown in Table 1, wherein A and B have the same meanings as the above.

TABLE 1

| | Viscosity | Average Particle Diameter |
| --- | --- | --- |
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |
| Example 11 | A | A |
| Example 12 | A | A |
| Example 13 | A | A |
| Example 14 | A | A |
| Example 15 | A | A |
| Example 16 | A | A |
| Comparative Example 1 | B | B |
| Comparative Example 2 | B | B |
| Comparative Example 3 | B | B |
| Comparative Example 4 | B | B |
| Comparative Example 5 | B | B |

As apparent from the evaluation results given above, the pigment dispersions according to the present invention prepared in Examples 1 to 16 were excellent dispersions reduced in viscosity change and pigment particle diameter change.

The aqueous pigment dispersion prepared using the surface-treated agglomerated pigment according to the present invention can be reduced in viscosity change and pigment particle diameter change during storage, and can hence be stored for a prolonged period of time. Therefore, the pigment dispersion provided by the present invention can be advantageously used as a colorant for preparing inks for ink-jet printers, which are increasingly required to have higher functions in recent years, and for writing utensils.

While the invention has been described in detail and with reference to specific embodiments thereof, it will be apparent to one skilled in the art that various changes and modifications can be made therein without departing from the spirit and scope thereof.

What is claimed is:

1. An agglomerated organic pigment which comprises
   (1) an organic pigment compound,
   (2) either a sulfonated organic pigment compound obtained by incorporating at least one sulfo group into the organic pigment compound or a sulfonated organic pigment derivative obtained by incorporating at least one sulfonic group into a derivative of the organic pigment compound,
   (3) univalent inorganic counter ions bonded to sulfonic groups of component (2), and
   (4) bivalent or higher inorganic counter ions which are bonded to sulfonic groups of component (2) and each said sulfonic group has an at least univalent positive charge, the surface of said agglomerated organic pigment as a whole being positively charged.

2. The agglomerated pigment of claim 1, wherein the organic pigment compound is a quinacridone pigment, a phthalocyanine pigment, an azo pigment, a quinophthalone pigment, or an isoindolinone pigment.

3. The agglomerated pigment of claim 2, wherein the quinacridone pigment is C.I. Pigment Red 122, 202, or 209 or C.I. Pigment Violet 19.

4. The agglomerated pigment of claim 2, wherein the phthalocyanine pigment is C.I. Pigment Blue 15, 15:1, 15:2, 15:3, 15:4, 15:6, or 16.

5. The agglomerated pigment of claim 2, wherein the isoindolinone pigment is C.I. Pigment Yellow 109 or C.I. Pigment Yellow 110.

6. The agglomerated pigment of any one of claims 1 to 5, wherein the content of the sulfonated organic pigment compound or sulfonated organic pigment derivative is at least $10 \times 10^{-6}$ equivalents in terms of the amount of sulfonic groups per g of the agglomerated pigment.

7. A process for producing the agglomerated organic pigment of claim 1 which comprises the step of:
   (1) bringing an organic pigment compound into contact with either a sulfonated organic pigment compound obtained by incorporating at least one sulfonic group into the organic pigment compound or a sulfonated organic pigment derivative obtained by incorporating at least one sulfonic group into a derivative of the organic pigment compound to thereby yield sulfonated agglomerates of the organic pigment compound;
   (2) treating the sulfonated agglomerates with a compound containing a univalent inorganic ion to replace at least one of the ionic bonds of each of bivalent or higher inorganic counter ions which have been bonded to the sulfonic groups with the univalent inorganic ion to thereby convert the bivalent or higher inorganic counter ions into bivalent or higher inorganic counter ions each having an at least univalent positive charge, thereby yielding counter-ion-replaced agglomerates; and
   (3) washing the counter-ion-replaced agglomerates to remove the inorganic ions not bonded to the sulfonic groups.

8. The process of claim 7, wherein the sulfonated agglomerates are yielded by dissolving the organic pigment compound and the sulfonated organic pigment compound or sulfonated organic pigment derivative in a solvent for both and then removing the solvent from the resultant solution.

9. The process of claim 7, wherein the sulfonated agglomerates are yielded by preparing an aqueous suspension of the organic pigment compound, adding thereto an aqueous solution of the sulfonated organic pigment compound or sulfonated organic pigment derivative, and then removing the suspension medium and the water.

10. The process of any one of claims 7 to 9, wherein the compound containing a univalent inorganic ion is an alkali metal hydroxide.

11. The process of any one of claims 7 to 10, wherein the counter-ion-replaced agglomerates are washed with ion-exchanged water.

12. A dispersion comprising fine particles obtained by pulverizing the agglomerated organic pigment of claim 1, a dispersant, and water.

13. The dispersion of claim 12, wherein the total amount by equivalent of all metal ions contained per g of the dispersion is up to 80 times the neutralization equivalent of the sulfonic groups contained per g of the dispersion.

14. A water-based ink composition comprising fine particles obtained from the agglomerated organic pigment of claim 1, a dispersant, and water.

* * * * *